United States Patent
Kobayashi

[11] Patent Number: 6,160,822
[45] Date of Patent: Dec. 12, 2000

[54] ATM CELL SYNCHRONIZATION CIRCUIT

[75] Inventor: Takayuki Kobayashi, Tokyo, Japan

[73] Assignee: NEC Corporation, Tokyo, Japan

[21] Appl. No.: 09/028,453

[22] Filed: Feb. 24, 1998

[30] Foreign Application Priority Data

Mar. 5, 1997 [JP] Japan ................................ 9-049521

[51] Int. Cl.[7] ................................................. H04J 3/06
[52] U.S. Cl. ........................ 370/511; 370/514; 714/775
[58] Field of Search .................................... 370/503, 509,
370/511, 514, 395; 714/775

[56] References Cited

U.S. PATENT DOCUMENTS

| | | | |
|---|---|---|---|
| 4,593,393 | 6/1986 | Mead et al. | 714/757 |
| 5,103,451 | 4/1992 | Fossey | 714/757 |
| 5,132,975 | 7/1992 | Avaneas | 714/757 |
| 5,287,530 | 2/1994 | Davis et al. | 370/395 X |
| 5,345,451 | 9/1994 | Uriu et al. | 714/775 |
| 5,568,482 | 10/1996 | Li et al. | 370/471 |
| 5,619,499 | 4/1997 | Nakabayashi | 370/395 X |
| 5,768,274 | 6/1998 | Murakami et al. | 370/395 |

FOREIGN PATENT DOCUMENTS

| | | |
|---|---|---|
| 3-235441 | 10/1991 | Japan . |
| 4-96544 | 3/1992 | Japan . |
| 4-211547 | 8/1992 | Japan . |
| 4-247744 | 9/1992 | Japan . |
| 5-191430 | 7/1993 | Japan . |
| 6-164624 | 6/1994 | Japan . |
| 8-51433 | 2/1996 | Japan . |

OTHER PUBLICATIONS

Japanese Office Action dated Oct. 20, 1998 with English language translation of Japanese Examiner's comments.

*Primary Examiner*—Chau Nguyen
*Assistant Examiner*—Phuongchau Ba Nguyen
*Attorney, Agent, or Firm*—McGuireWoods LLP

[57] ABSTRACT

An ATM cell synchronization circuit can be realized by a circuit construction operable at low speed. Cell strings developed into eight parallel strings by a serial to parallel development circuit are further developed into 8n parallel strings. A frequency of a clock signal synchronous with bytes of the input cell string is divided into n by a frequency divider circuit for lowering speed to be 1/n. The parallel developed signals are rearranged by a shifted register into a signal string for detection by HEC (Header Error Control) detecting circuit. Then, an HEC byte is detected by the HEC detecting circuit. In order to detect the HEC bytes located at n positions, n in number of HEC detecting circuits are provided, At this time, the HEC byte after n cells becomes the same position. The interval of n cell is fifty-three. Therefore, a counter counting fifty-three is provided. Respectively predetermined values are detected by the decoders to generate detection signals. The detection signals are compared with detection signals of the HEC detecting circuits. When the detection signal of the decoder and the detection signal of the HEC detecting circuit match, the start control of the counter from free-run condition, for establishing synchronized state.

9 Claims, 12 Drawing Sheets

FIG. 5

| BIT 1 2 ... 7 8 | CELL #1 | CELL #2 | CELL #3 | CELL #4 | CELL #5 | CELL #6 |
|---|---|---|---|---|---|---|

| | CELL #1 | | CELL #2 | | CELL #3 | | CELL #4 | | CELL #5 | | CELL #6 | |
|---|---|---|---|---|---|---|---|---|---|---|---|---|
| 11 | P43 | H1 | P44 | H2 | P45 | H3 | P46 | H4 | P47 | HEC5 | P48 | H1 |
| 12 | P44 | H2 | P45 | H3 | P46 | H4 | P47 | HEC4 | P48 | H1 | | H2 |
| 13 | P45 | H3 | P46 | H4 | P47 | HEC3 | P48 | H1 | | H2 | | H3 |
| 14 | P46 | H4 | P47 | HEC2 | P48 | H1 | | H2 | | H3 | | H4 |
| 15 | P47 | HEC1 | P48 | H1 | | H2 | | H3 | | H4 | | HEC1 |

| 21 | P42 | P48 | P43 | H1 | P44 | H2 | P45 | H3 | P46 | H4 | P47 | HEC6 |
| 22 | P48 | H1 | P44 | H2 | P45 | H3 | P46 | H4 | P47 | HEC5 | | P1 |
| 23 | H1 | P2 | P45 | H3 | P46 | H4 | P47 | HEC4 | P48 | H1 | | P2 |
| 24 | H2 | P3 | P46 | H4 | P47 | HEC3 | P48 | H1 | | H2 | | P3 |
| 25 | H3 | P4 | P47 | HEC2 | P48 | H1 | | H2 | | H3 | | P4 |

| 31 | P41 | P47 | P42 | P48 | P43 | H1 | P44 | H2 | P45 | H3 | P46 | H4 |
| 32 | P42 | P48 | P43 | H1 | P44 | H2 | P45 | H3 | P46 | H4 | P47 | HEC6 |
| 33 | P43 | H1 | P44 | H2 | P45 | H3 | P46 | H4 | P47 | HEC5 | P48 | H1 |
| 34 | P44 | H2 | P45 | H3 | P46 | H4 | P47 | HEC4 | P48 | H1 | | H2 |
| 35 | P45 | H3 | P46 | H4 | P47 | HEC3 | P48 | H1 | | H2 | | H3 |

FIG.6

| BIT | | CELL #1 | CELL #2 | CELL #3 | CELL #4 | CELL #5 | CELL #6 | |
|---|---|---|---|---|---|---|---|---|

| | BIT | | | | | | | | | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 100 | 1<br>2<br>⋮<br>7<br>8 | | | | | | | | | | | | | | | | | | | | | | | | | | | | | | | | | | | | | | | | | | | | | | |
| 114 | 41<br>42<br>43<br>44<br>45 | P40 P41 P42 P43 P44 | P46 P47 P48 H1 H2 | H4 HEC1 P1 P2 P3 | P5 P6 P7 P8 P9 | P41 P42 P43 P44 P45 | P47 P48 H1 H2 H3 | HEC2 P1 P2 P3 P4 | P6 P7 P8 P9 P10 | P42 P43 P44 P45 P46 | P48 H1 H2 H3 H4 | HEC3 P1 P2 P3 P4 | P7 P8 P9 P10 P11 | P43 P44 P45 P46 P47 | H1 H2 H3 H4 HEC4 | P1 P2 P3 P4 P5 | P8 P9 P10 P11 P12 | P44 P45 P46 P47 P48 | H2 H3 H4 HEC5 P1 | P3 P4 P5 P6 P7 | P9 P10 P11 P12 P13 | P45 P46 P47 P48 H1 | H3 H4 HEC6 P1 P2 | P4 P5 P6 P7 P8 | P10 P11 P12 P13 P14 | P46 P47 P48 H1 H2 |
| 115 | 51<br>52<br>53<br>54<br>55 | P39 P40 P41 P42 P43 | P45 P46 P47 P48 H1 | H3 H4 HEC1 P1 P2 | P4 P5 P6 P7 P8 | P40 P41 P42 P43 P44 | P46 P47 P48 H1 H2 | H4 HEC2 P1 P2 P3 | P5 P6 P7 P8 P9 | P41 P42 P43 P44 P45 | P47 P48 H1 H2 H3 | HEC3 P1 P2 P3 P4 | P6 P7 P8 P9 P10 | P42 P43 P44 P45 P46 | P48 H1 H2 H3 H4 | HEC4 P1 P2 P3 P4 | P7 P8 P9 P10 P11 | P43 P44 P45 P46 P47 | H1 H2 H3 H4 HEC5 | P1 P2 P3 P4 P5 | P8 P9 P10 P11 P12 | P44 P45 P46 P47 P48 | H2 H3 H4 HEC6 P1 | P3 P4 P5 P6 P7 | P9 P10 P11 P12 | P45 P46 P47 P48 H1 |
| 116 | 61<br>62<br>63<br>64<br>65 | P38 P39 P40 P41 P42 | P44 P45 P46 P47 P48 | H2 H3 H4 HEC1 P1 | P3 P4 P5 P6 P7 | P39 P40 P41 P42 P43 | P45 P46 P47 P48 H1 | H3 H4 HEC2 P1 P2 | P4 P5 P6 P7 P8 | P40 P41 P42 P43 P44 | P46 P47 P48 H1 H2 | H4 HEC3 P1 P2 P3 | P5 P6 P7 P8 P9 | P41 P42 P43 P44 P45 | P47 P48 H1 H2 H3 | HEC4 P1 P2 P3 P4 | P6 P7 P8 P9 P10 | P42 P43 P44 P45 P46 | P48 H1 H2 H3 H4 | HEC5 P1 P2 P3 P4 | P7 P8 P9 P10 | P43 P44 P45 P46 P47 | H1 H2 H3 H4 HEC6 | P1 P2 P3 P4 P5 | | P44 P45 P46 P47 P48 |

ATM CELL FORMAT

ATM CELL SYNCHRONIZATION CIRCUIT

BACKGROUND OF THE INVENTION

1. Field of the Invention

The present invention relates generally to an ATM (Asynchronous Transfer Mode) cell synchronization circuit. More specifically, the invention relates to an ATM cell synchronization circuit which establishes synchronization of an ATM cell by detecting fifth order byte as an HEC (Header Error Control) byte among a cell header of an ATM cell string consisted of fifty-three bytes per one cell and transmitted with parallel development into eight strings.

2. Description of the Related Art

An ATM cell in an ATM communication system is consisted of fifty-three bytes per one cell, having a cell format shown in FIG. 12. In the ATM cell, the leading five byte is a region referred to as a header, and the remaining forty-eight bytes is a so-called payload region. Among five bytes in the header, an information contained in fifth order byte is a portion referred to as HEC (Header Error Control) byte.

In a cell string which is a flow of the cells, in which the ATM cells are continuous, it is required to detect the position of each cell. This is referred to as cell synchronization. In order to perform cell synchronization, the HEC byte region is provided.

In an ATM cell signal output device or the like to a transmission path, information in the first to fourth order bytes are arithmetically processed according to a predetermined rule to store the result of the arithmetic operation in the HEC byte region.

An ATM cell synchronization circuit for foregoing cell synchronization is provided in a receiver device or the like for receiving an ATM cell signal. Per every four bytes of the input ATM cell string, the foregoing arithmetic operation is performed with shifting per one byte to check whether the result of the arithmetic operation matches with the content of the fifth order byte to detect the position of the HEC byte and thus detect a positional relationship of the cells, namely cell synchronization.

In the conventional ATM cell synchronization circuit, process has been performed using the ATM cell signal developed into eight parallel strings (eight bits parallel strings, namely per one byte). It should be appreciated that performing process for the data signal of the ATM cell string developed into eight parallel strings may not cause any problem when a transmission speed is low, whereas, it becomes impossible to adapted for high speed operation due to limitation of speed of operations of components of the ATM cell synchronization circuit.

In order to adapt for high transmission speed, there has been proposed a technology for slow-down the nominal speed of the process by further parallel development. However, since the ATM cell is consisted of fifty-three bytes (fifty-three is prime factor) per one cell as set forth above, it is difficult to construct digital circuit for parallel development into a strings of 1/53.

Accordingly, as disclosed in Japanese Unexamined Patent Publication (Kokai) No. Heisei 4-247744, for the ATM cell consisted of fifty-three bytes, one or more dummy bytes are inserted in the cell to make the cells to be consisted of fifty-four byte or sixty byte to facilitate parallel development.

In the technology disclosed in Japanese Unexamined Patent Publication No. Heisei 4-247744, it is necessary to insert the dummy data in the cell. Therefore, it has been necessary to convert the processing speed for the amount of the inserted dummy data or to share a cell band for the dummy data in order to perform the same process at the same speed.

SUMMARY OF THE INVENTION

It is an object of the present invention to provide an ATM cell synchronization circuit which can construct a circuit at a low speed by parallel development of an ultra high speed ATM cell string, without using a dummy data.

According to one aspect of the present invention, an asynchronous transmission mode (ATM) cell synchronization circuit for establishing synchronization of an asynchronous transmission mode cell string transmitted as developed into eight parallel strings, comprises:

parallel developing means for performing parallel development of data signal of the asynchronous transmission mode cell developed into eight strings into 8×n (n is an integer greater than or equal to two) data signals;

frequency dividing means for dividing an input clock signal synchronized with byte of the asynchronous transmission mode cell by n;

phase shifting means for generating n kinds of 8×n data signals with shifting phase of the outputs of the parallel developing means per eight bits;

n in number of cell header detecting means, provided corresponding to n kinds of data signals, for detecting predetermined byte in cell headers of corresponding data signals;

counting means for selectively loading n kinds of load values preliminarily set corresponding to respective of n kinds of data signals in response to detection timings of respectively corresponding cell header detecting means and for performing fifty-three base counting operation in synchronism with a divided clock of a frequency divider;

n in number of decoding means for detecting the output of the counting means reaching the n kind of load value;

matching detecting means for comparing n in number of decoded output and n in number of outputs of the corresponding cell header detecting means; and synchronization establishment detecting means for detecting establishment of synchronization in response to a matching detection signal from the matching detecting means.

In the ATM cell synchronization circuit according to the present invention constructed as set forth above, at first, by the parallel development means, the input signal of eight parallel cell strings are further developed into 8×n parallel strings. On the other hand, by the frequency dividing means, the frequency of the input clock signal is divided into 1/n adapting to the data signal. By this operation, an operation frequency of cell processing circuits in the subsequent stages can be 1/n. Therefore, even when the input signal is high speed, it can be processed with low processing speed.

Next, by the phase shifting means, the parallel developed signal is re-arranged in the order adapted for detection of the HEC byte by an HEC detecting circuit. In the HEC detecting circuit, per every four bytes of the input ATM cell string, a predetermined arithmetic operation is performed to matching with the next one byte for detecting the HEC byte. In the shown construction, n in number of HEC detecting circuits are required for detecting the HEC's located in n in number of mutually different positions.

As set forth above, while the HEC's are located at n in number of positions, the HEC byte is returned to the same position after n cells. The interval of n cells is fifty-three. In order to count fifty-three, a counter is provided. The positions of the HEC bytes are specified by the decoder circuits. The n kinds of decoders are provided.

For the counter counting fifty-three, the start control from the condition of out of synchronization, and free-running control of the counting operation under the synchronized state are performed. When control the output of the decoder circuit and the output of the HEC detecting circuit match, establishment of synchronization is performed in response thereto to terminal free-run condition of the counter circuit to enter into synchronization counting operation.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 5 is a timing chart showing an operation of the preferred embodiment of the ATM cell synchronization circuit as illustrated in the block diagram shown in FIG. 1;

FIG. 6 is a timing chart showing an operation of the preferred embodiment of the ATM cell synchronization circuit as illustrated in the block diagram shown in FIG. 1;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a through understanding of the present invention. It will be obvious, however, to those skilled in the art that the present invention may be practiced without these specific details. In other instance, well-known structures are not shown in detail in order to avoid unnecessarily obscure the present invention.

Figure 1:
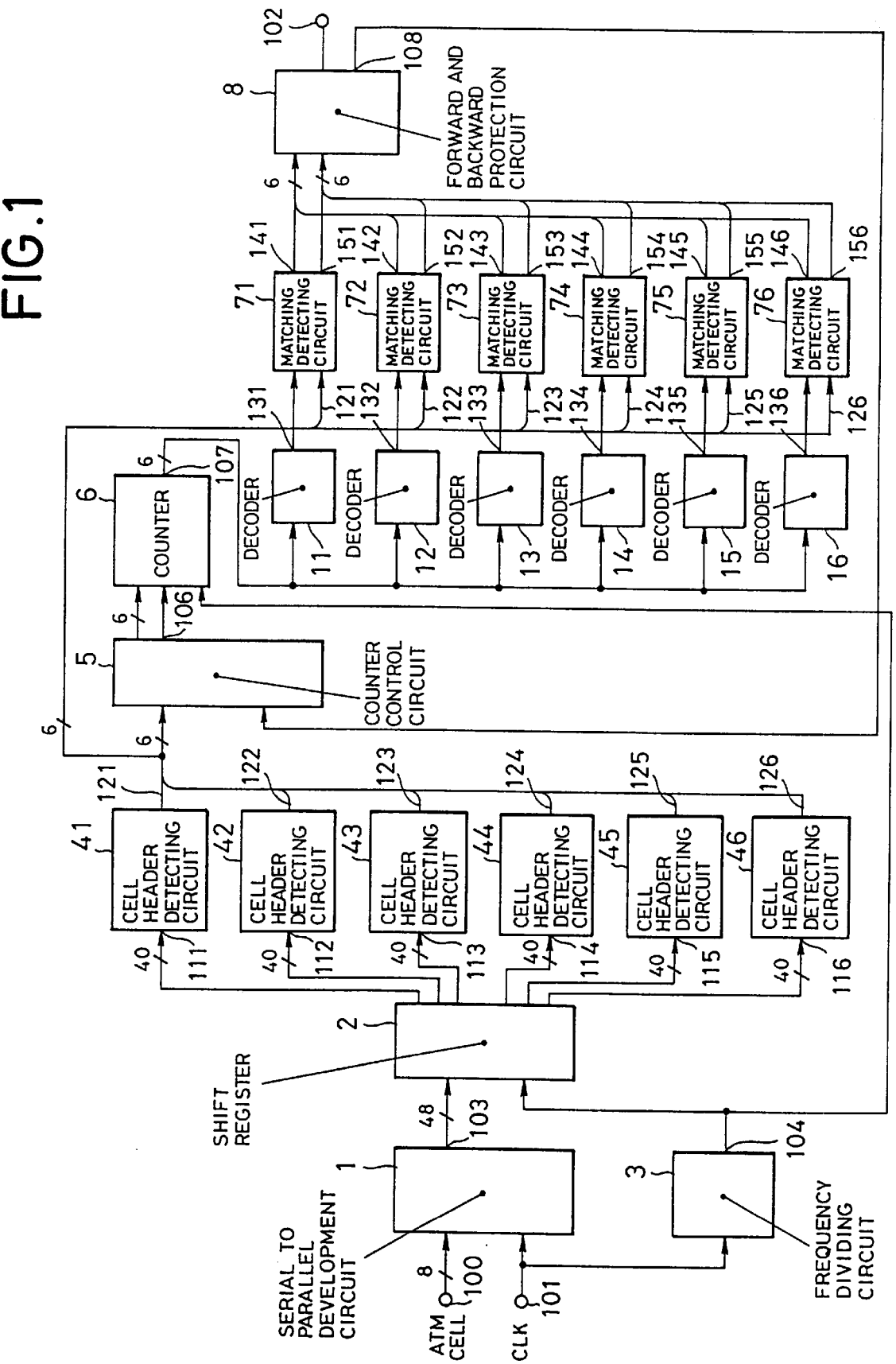
FIG. 1 is a block diagram of preferred embodiment (n=6) of an ATM cell synchronization circuit according to the present invention.

FIG. 1 is a block diagram showing the preferred embodiment of an ATM cell synchronization circuit according to the present invention. In order to facilitate disclosure of the shown embodiment, discussion will be given hereinafter for an example of the case where n=6. FIGS. 4 to 7 are timing charts of the ATM cell synchronization circuit illustrated in the block diagram of FIG. 1.

In FIGS. 4 to 7, leading first to four order bytes in the header portion of the cell will be expressed as H1 to H4, the fifth order byte in the header portion will be expressed as HEC, and first to forty-eight order bytes of a payload portion will be expressed as P1 to P48.

An input ATM cell signal 100 which is developed into eight parallel strings, is developed into n in number (=6) of parallel strings by a serial/parallel development circuit 1 on the basis of an input clock signal 101. When fifty-three bytes per one cell is divided into six, five is left as a remainder. As a result, the position of the HEC byte is shifted for one byte per each cell. On the other hand, the input clock signal 101 is converted into a clock signal 104 having a frequency of one sixth of the input clock signal 101, by a frequency divider circuit 3. By the serial/parallel development circuit 1 and the frequency divider circuit 3, it becomes possible to perform a process at a speed one sixth of a transmission speed.

Figure 2:
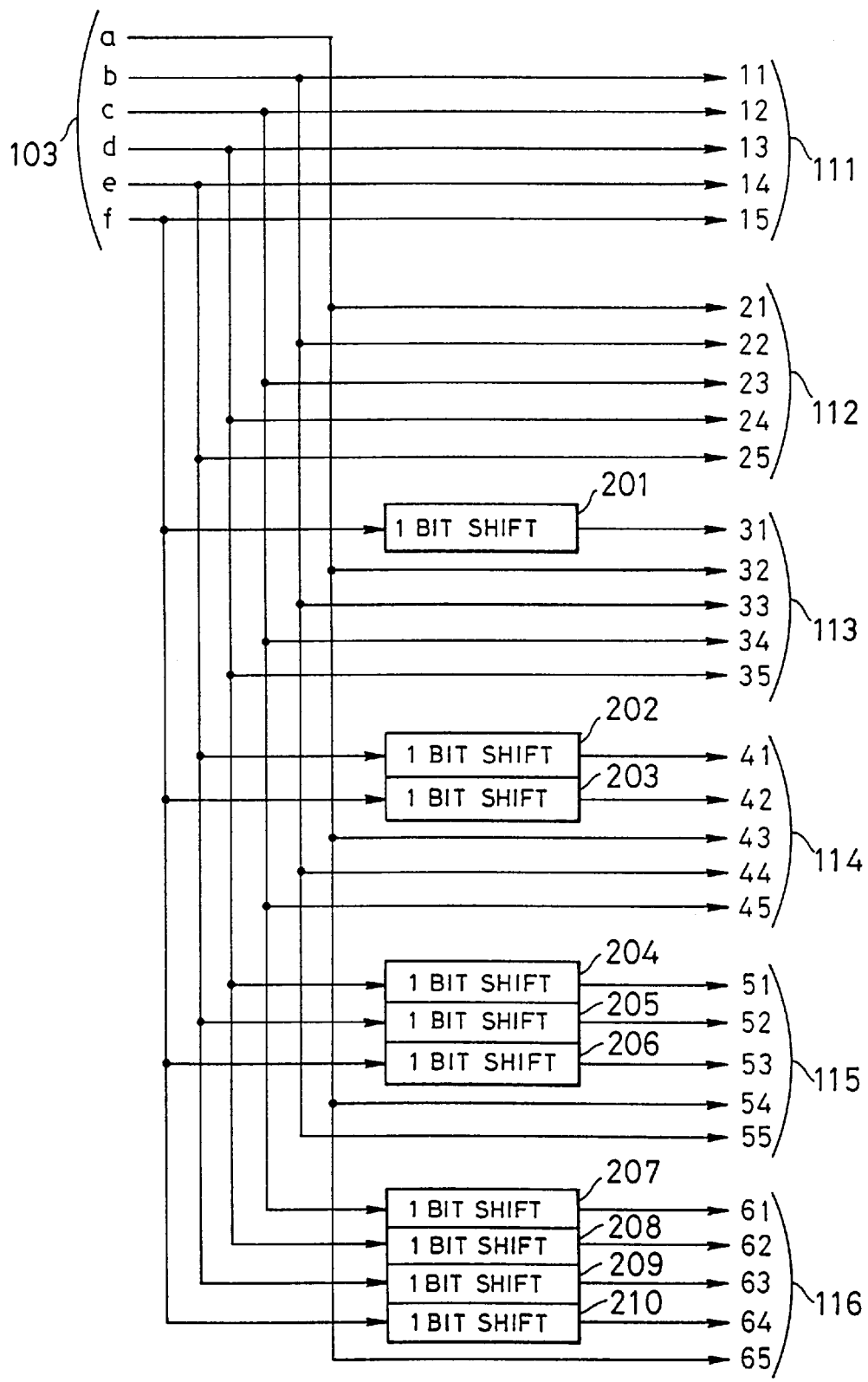
FIG. 2 is a block diagram showing an example of a shift register 2 in the ATM cell synchronization circuit of the block diagram in FIG. 1.

A shift register 2 is constructed with one bit shifting circuits 201 to 210, as exemplified in FIG. 2. By providing delay to and effecting arrangement for output signals 103 of the serial/parallel development circuit 1 so as to correspond to respective of cell header detecting circuits, the output of the serial/parallel development circuit 1 is converted as represented by 111 to 116 of FIGS. 5 and 6. Here, it is assumed that rearrangement is effected so that a first cell header detecting circuit 41 detects the phase of the HEC byte of a cell #1, similarly, a second cell header detecting circuit 42 detects the phase of the HEC byte of a cell #2, a third cell header detecting circuit 43 detects the phase of the HEC byte of a cell #3, . . . a sixth cell header detecting circuit 46 detects the phase of the HEC header of a cell #6.

In each of the six cell header detecting circuits 41 to 46, predetermined arithmetic operation is performed for respective first to thirty-second bits (four bytes) of input signals 111 to 116 per each time slot to compare the result of arithmetic operation with a content of the thirty-third to the fortieth bits (next byte). When the result of comparison shows matching, the one byte data in the thirty-third to fortieth bits of the relevant time slot is judged as the HEC byte. Then, matching signals 121 to 126 (here "L" pulses) are output.

The ATM cell signal 103 developed into 8×6 parallel strings becomes the same phase with taking six cells as one cycle. A fifty-three base counter 6 counts the time slots of this one cycle. Here, in a condition where synchronization is established, the position of the HEC byte of the cell #1 is set at the counter value "1". The counter 6 repeats counting up each time slot in a range of one to fifty-three to output a result 107.

A counter control circuit 5 performs start control of the counter by an output signal 108 from a forward and backward protection circuit 8. While this signal 108 is output, a start signal 106 starting the counter is output at a timing, at which one of the six cell header detecting circuits 41 to 46 first detects the HEC byte.

Upon starting, if the cell header detecting circuit 41 first detects the HEC byte, a start value is determined to be "1". On the other hand, when the cell header detecting circuit 42 first detects the HEC byte, the start value is determined to be "10" . . . When the cell header detecting circuit 46 first detects the HEC byte, the start value is determined to be "46". Then, the determined start value 105 is output. By this start control, from a moment where one of six cell header detecting circuit 4 detects the HEC byte, the period of the ATM cell and the counter can be matched. On the other hand, when output signal 108 is not output from the forward and backward protection circuit 8, the start signal 106 is not output. As a result, the fifth-three base counter 6 performs free-run.

Figure 3:
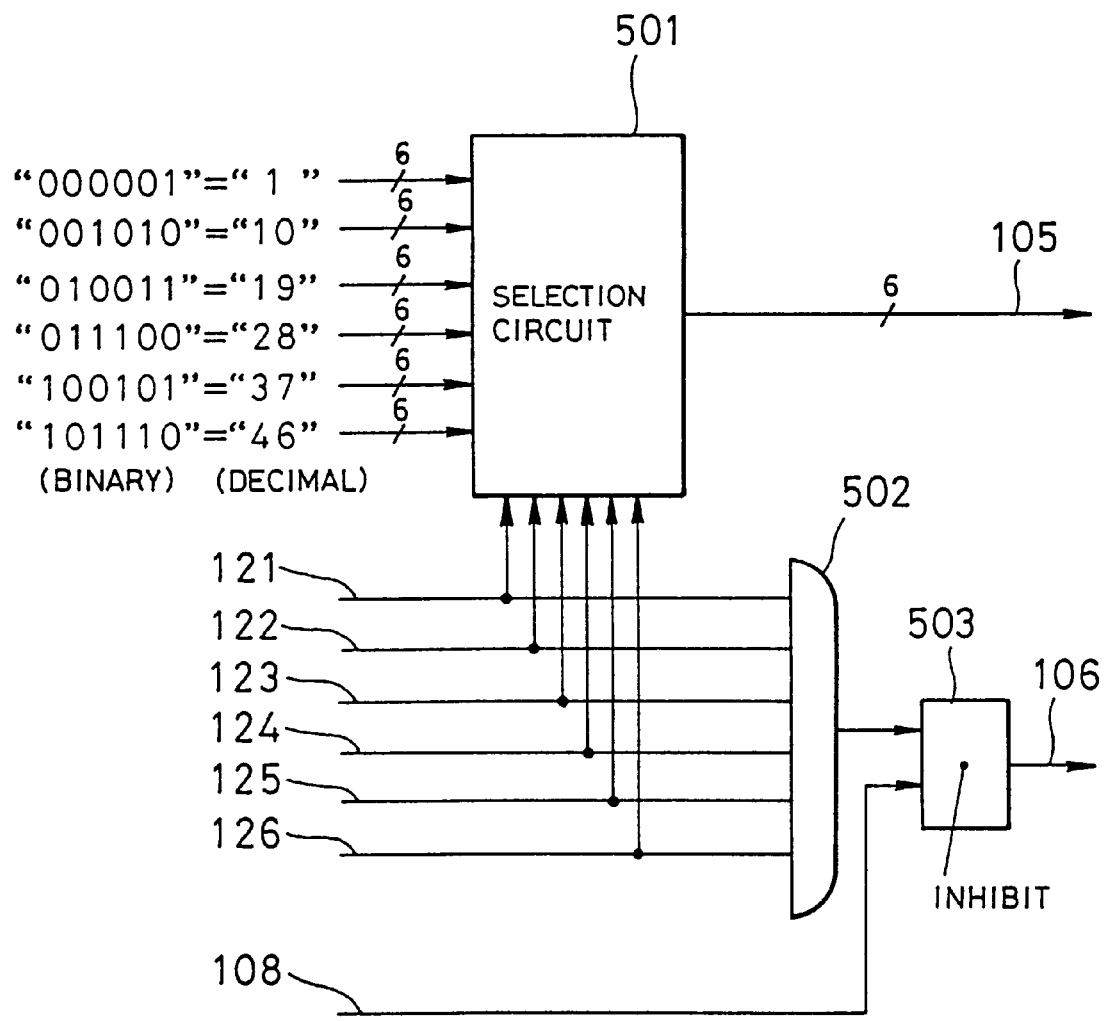
FIG. 3 is a block diagram showing an example of a counter control circuit 5 in the ATM cell synchronization circuit of the block diagram in FIG. 1.
Figure 4:
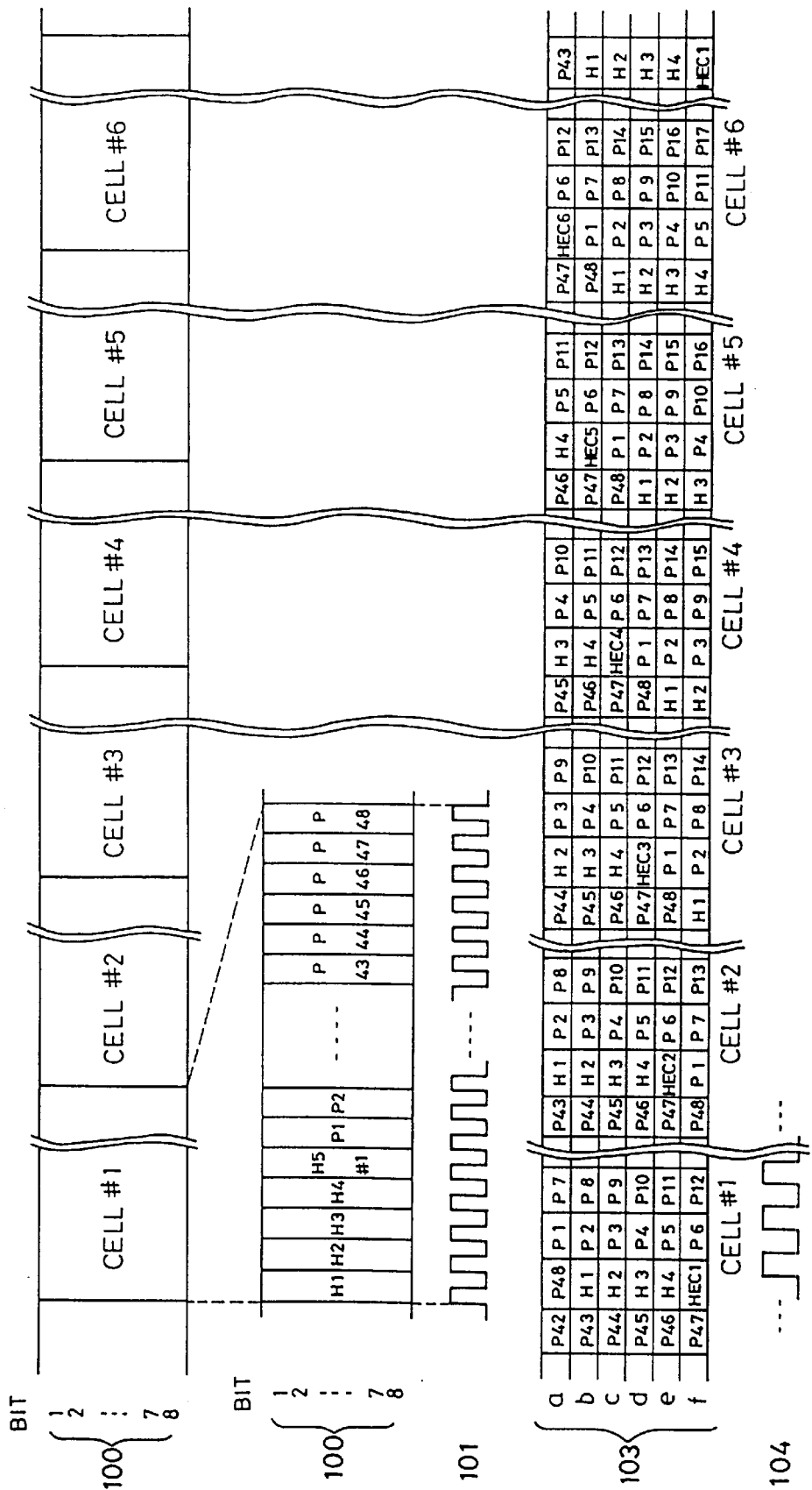
FIG. 4 is a timing chart showing an operation of the preferred embodiment of the ATM cell synchronization circuit as illustrated in the block diagram shown in FIG. 1.
Figure 7:
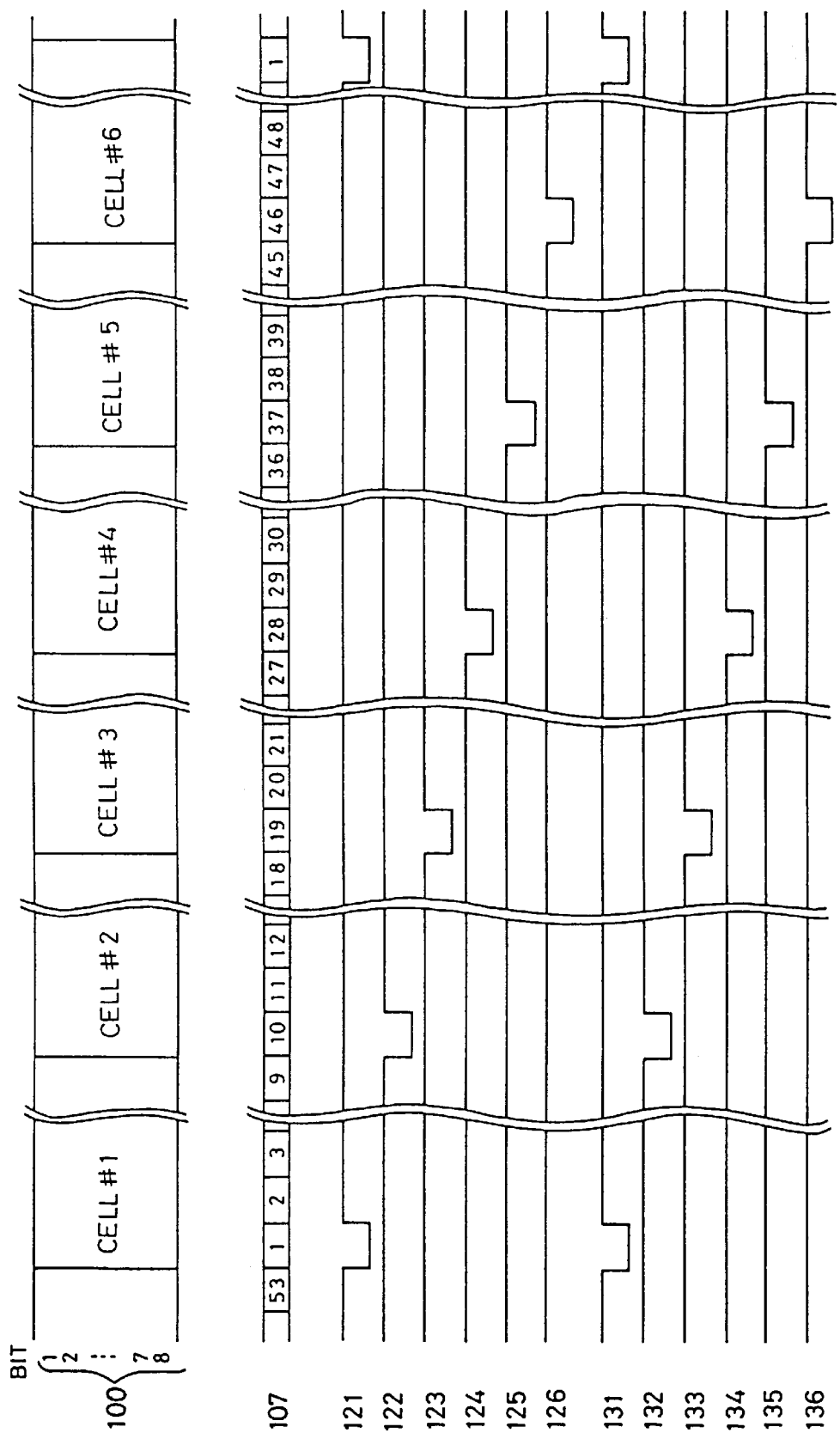
FIG. 7 is a timing chart showing an operation of the preferred embodiment of the ATM cell synchronization circuit as illustrated in the block diagram shown in FIG. 1.

FIG. 3 is a block diagram showing particular example of a counter control circuit 6. In FIG. 3, a selection circuit 501 selecting six kinds of start values (load values) of "1". "10", "19", "28", "37" and "46" in decimal expression, is provided. As selection signals of the selection circuit 501, the outputs 121 to 126 of the results from the cell header detecting circuit 41 to 46 are used.

In response to being "L" (for enabling) of each of the outputs 121 to 126 of the results of the cell header detecting circuits, the selection circuit 501 respectively selects "1", "10", "19", "28", "37" and "46" as output 105 to lead out as the load value of the counter 6.

It should be noted that the output result 121 to 126 of the cell header detecting circuits 41 to 46 are input to an AND gate 502. When any one of the output results (121 to 126) becomes enable "L", a count start signal 106 is generated.

At this time, the reason why the count start signal (load signal) 106 is output via an inhibit circuit 503, is that the start signal has to be generated only once upon out of synchronization. Therefore, masking is performed by the output signal 108 from the forward and backward protection circuit 8.

Six kinds of decoders 11 to 16 decode output signal 107 from the fifty-three base counter 6 to output results 141 to 146 (here "L" pulse). Decoded values of respective decoders 11 to 16 are respectively "1", "10", "19", "28", "37" and "46".

In six matching detecting circuits 71 to 76, the output results 121 to 126 of six cell header detecting circuits 41 to 46 and resultant signals 131 to 136 of the decoders 11 to 16 are compared. When matched, matching signals 141 to 146 are output, and otherwise, un-matching signals 151 to 156 are output.

The forward and backward protection circuit 8 makes judgement whether synchronization is established or not on the basis of the matching detection resultant signals 141 to 146 or the un-matching detection resultant signals 151 to 156 for issuing output 102. When a predetermined number of un-matching signals are continuously received from the un-matching signal 15$y$ ($y$ is any one of 1 to 6) of the matching detection circuits 71 to 76, a condition out of synchronization is judged.

Conversely from the forward protection, the backward protection outputs the result 102 as a condition where synchronization is established when the matching signals 141 to 146 are continuously received from reception of any one of the matching signals 141 to 146 in a predetermined number.

On the other hand, the output signal 108 represents a period to first detect matching from a condition out of synchronization and a period to detect next matching from once fallen out of synchronization after detection of the HEC from the condition of out of synchronization.

In the foregoing discussion, the ATM cell synchronization circuit for parallel development of 8×6 has been discussed. In the practical circuit, a transmission data of 2488.32 Mb/s can be processed at low speed of 51.8 Mb/s of 1/(8×6), for example.

While the foregoing embodiment has been discussed about n=6, the same or similar process can be taken for any of the value of n. The value of n may be varied depending upon the speed of the transmission path and the speed of the processing circuit.

Figure 8:
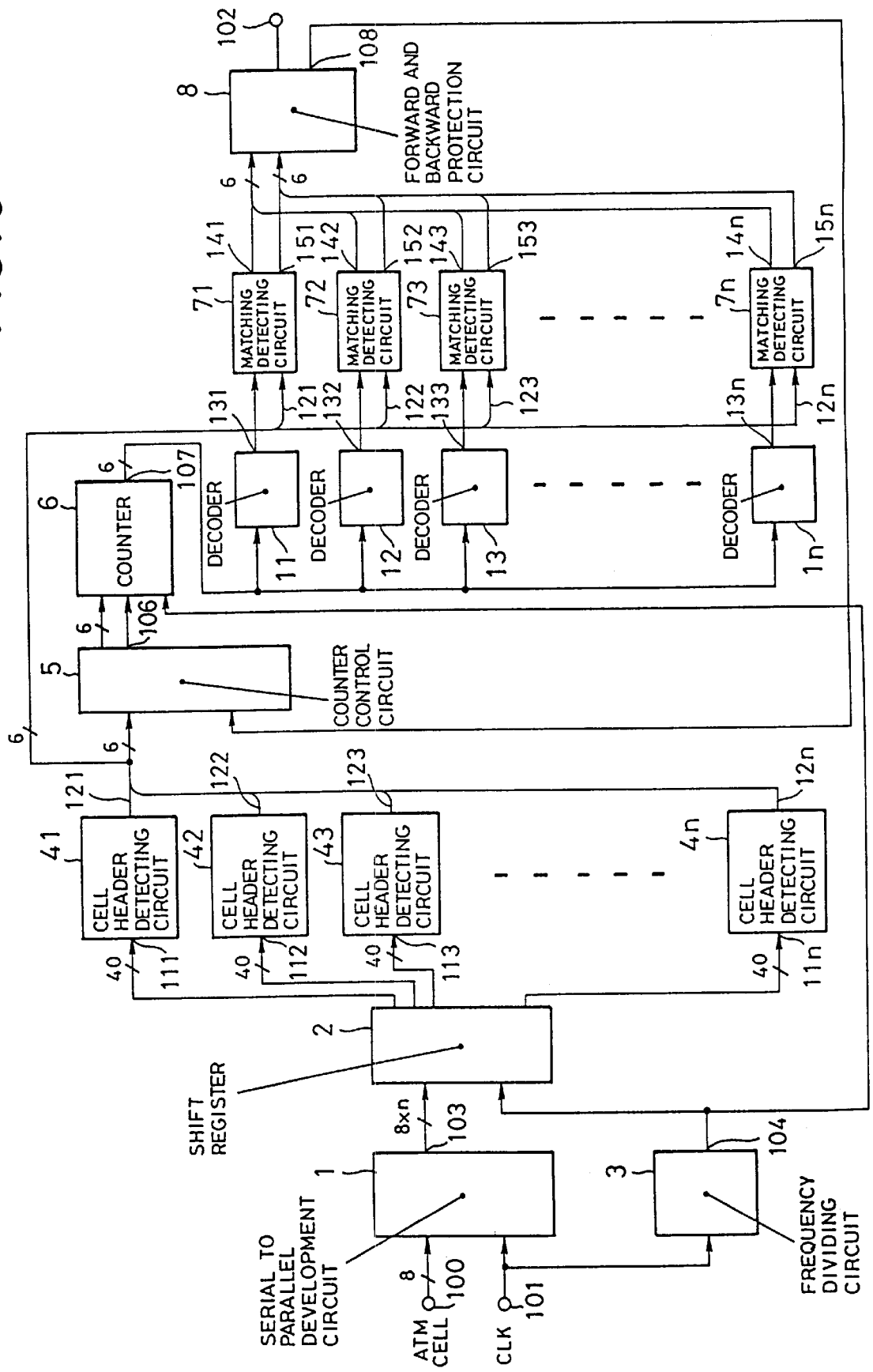
FIG. 8 is a block diagram showing a general embodiment of the ATM cell synchronization circuit according to the present invention.
Figure 9:
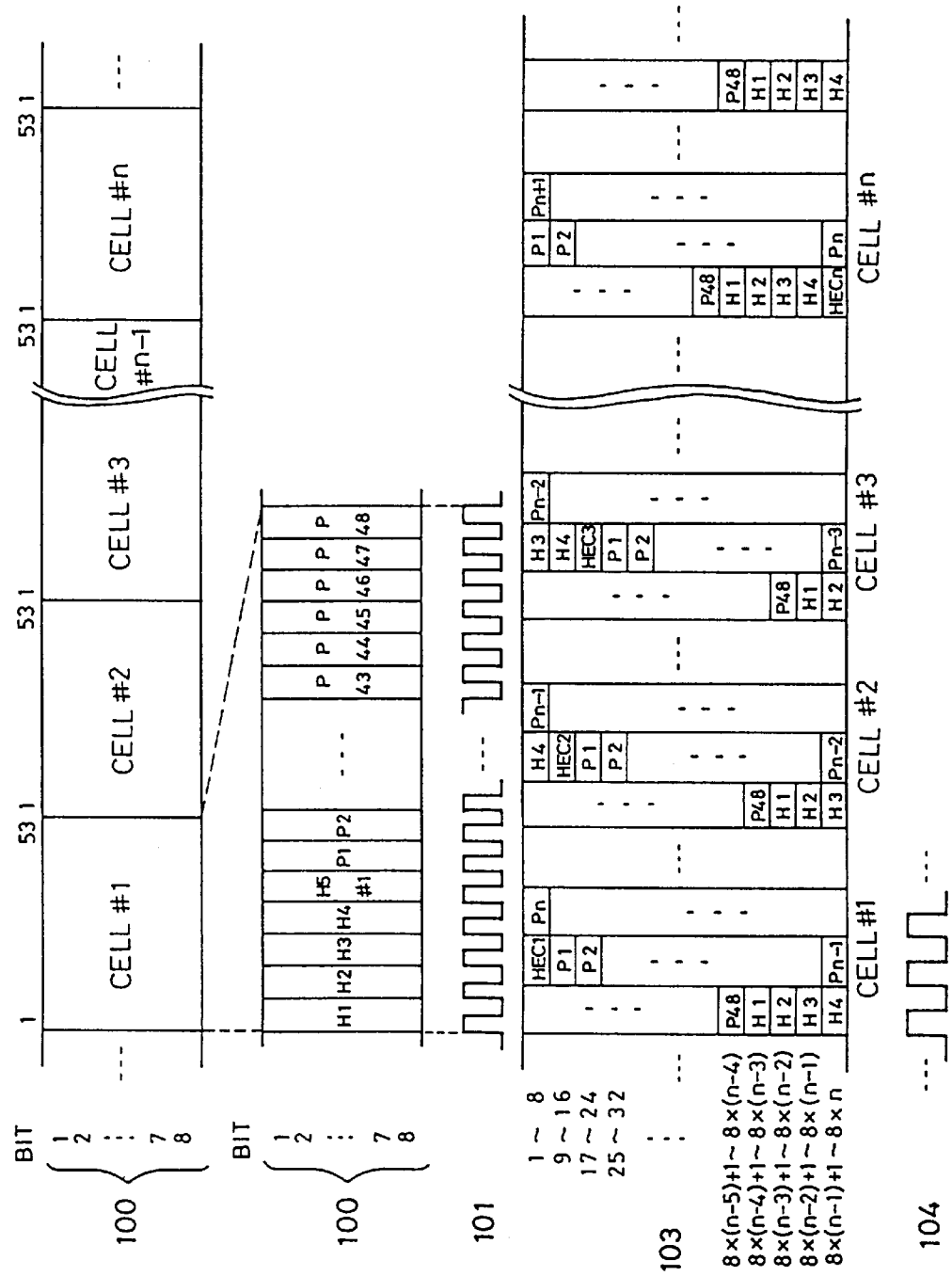
FIG. 9 is a timing chart showing an operation of the preferred embodiment of the ATM cell synchronization circuit as illustrated in the block diagram shown in FIG. 8.
Figure 10:
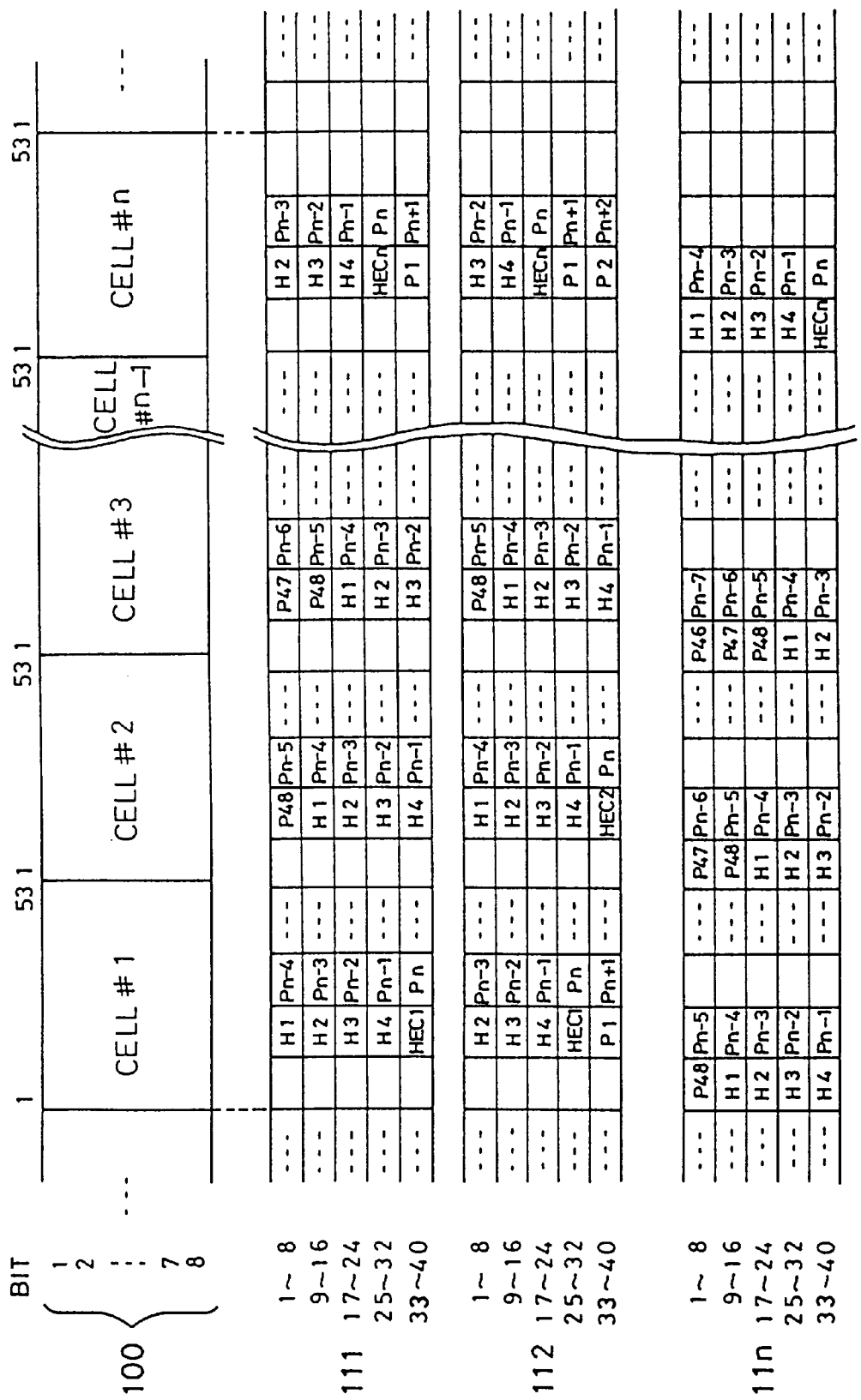
FIG. 10 is a timing chart showing an operation of the preferred embodiment of the ATM cell synchronization circuit as illustrated in the block diagram shown in FIG. 8.
Figure 11:
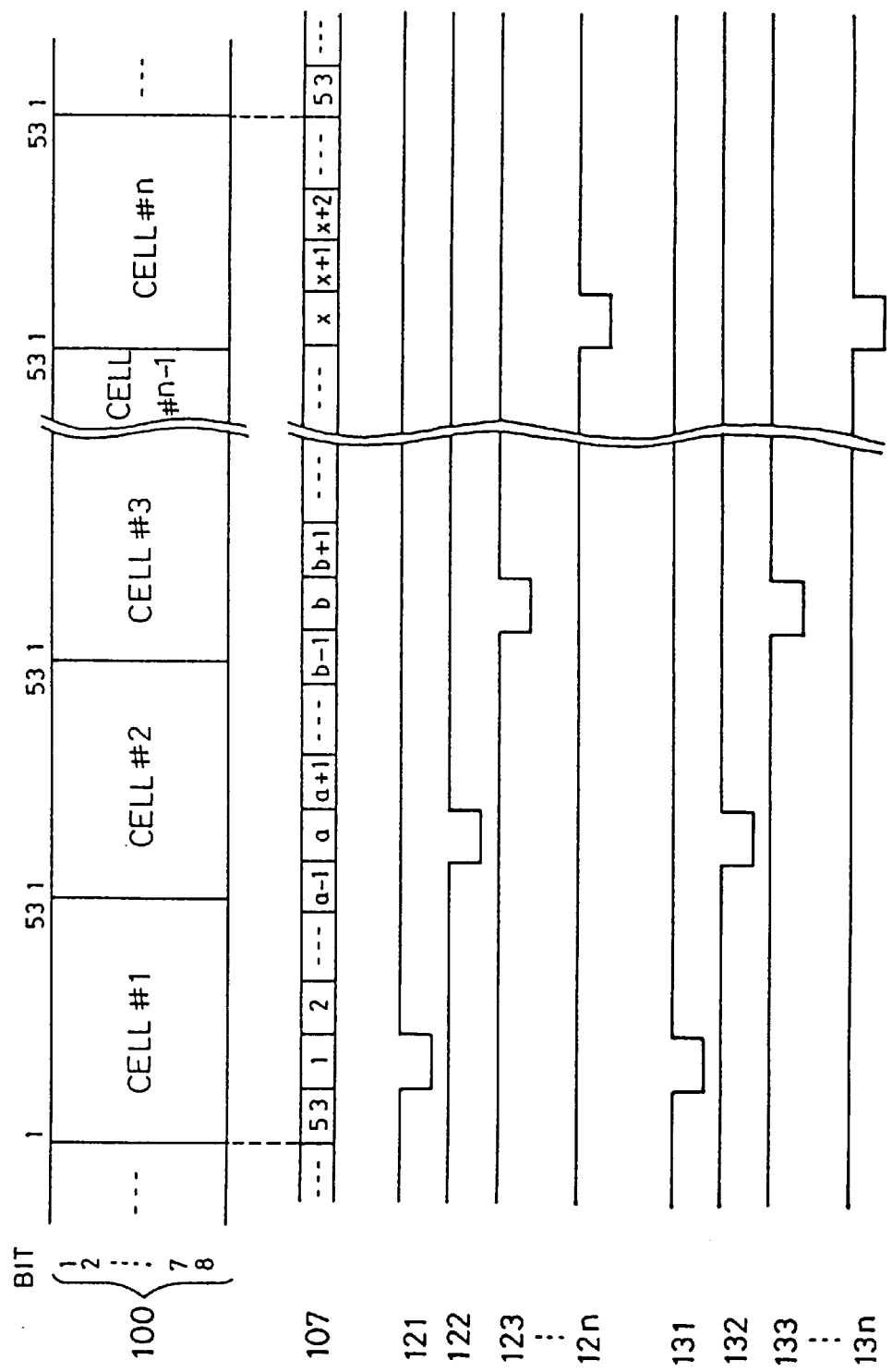
FIG. 11 is a timing chart showing an operation of the preferred embodiment of the ATM cell synchronization circuit as illustrated in the block diagram shown in FIG. 8.
Figure 12:
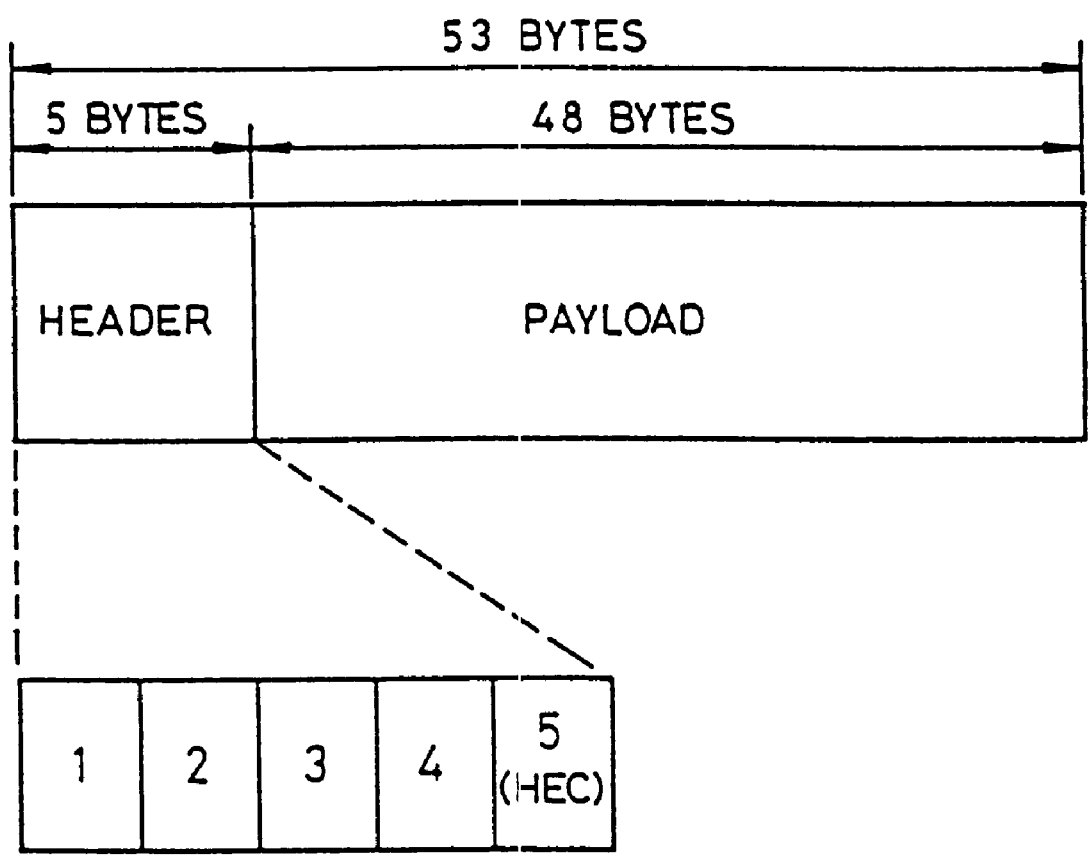
FIG. 12 is an illustration showing a format of an ATM cell.

FIG. 8 is a block diagram showing general embodiment of the ATM cell synchronization circuit according to the present invention, in which the value of n is not specified. Like parts to those shown in FIG. 1 will be identified by like reference numerals. FIGS. 9 to 11 are timing chart showing operation of the ATM cell synchronization circuit of FIG. 8.

The input ATM cell signal 100 which is parallel developed into eight parallel strings, is parallel developed into n parallel strings (n is an integer greater than or equal to two). It should be appreciated that the leading first to fourth bytes of the header portion of the cell in FIG. 9 will be represented by H1 to H4, the fifth byte of the header portion will be represented by HEC, and the first to forty-eighth bytes of the payload portion will be represented by P1 to P48.

At this time, one cell is consisted of fifty-three bytes, and fifty-three is a prime factor. In the case other than n=53, a remainder is inherently generated when fifty-three is divided by n, the position of the HEC byte is inherently shifted per each cell. By this shift, n types of phase of the cell are generated. The phase shift is repeated with a period of n cells.

On the other hand, the input clock signal 101 is converted into 1/n of frequency by the frequency dividing circuit 3. By the foregoing serial to parallel development circuit 1 and the frequency dividing circuit 3, low speed process becomes possible in the subsequent synchronization circuit even when the transmission speed is ultra high.

Since the cell signal 103 developed into 8×n of parallel strings have n kinds of phases, n in number of cell header detecting circuits 41 to 4*n* become necessary for adapting to respective phases. In the shift register 2, the output signal 103 of the serial to parallel development circuit 1 are rearranged adapting to respective cell header detecting circuits.

Here, it is exemplary assumed that the output signal 103 of the serial to parallel development circuit 1 is rearranged by the shift register 2 so that the first cell header detecting circuit 41 is adapted to detect the HEC byte of the phase of the cell #1, the second cell header detecting circuit 42 is adapted to detect the HEC byte of the phase of the cell #2, the third cell header detecting circuit 43 is adapted to detect the HEC byte of the phase of the cell #3, . . . the (n)th cell header detecting circuit 4*n* is adapted to detect the HEC byte of the phase of the cell #n. Then, the shift register 2 outputs rearranged signals as output signals 111 to 11*n* to respective cell header detecting circuits 41 to 4*n*.

In the n in number of the cell header detecting circuits 41 to 4*n*, predetermined arithmetic operation is performed for respective first to thirty-second bits (four bytes) of input signals 111 to 11*n* per each time slot to compare the result of arithmetic operation with a content of the thirty-third to the fortieth bits (next byte). When the result of comparison shows matching, the one byte data in the thirty-third to fortieth bits of the relevant time slot is judged as the HEC byte. Then, matching signals 121 to 12n (here "L" pulses) are output.

The ATM cell signal 103 developed into 8×n parallel strings becomes the same phase with taking n cells as one cycle. A fifty-three base counter 6 counts the time slots of this one cycle. Here, the counter 6 repeats counting up each time slot in a range of one to fifty-three to output a result 107 so that the position of the HEC byte of the cell #1 is set at the counter value "1" in a condition where synchronization is established, for example.

A counter control circuit 5 performs start control of the counter by an output signal 108 from a forward and backward protection circuit 8. The forward and backward protection circuit 8 is designed for detecting a condition of the cell out of synchronization. The output signal 108 is output during a period from a timing, at which the cell becomes out of synchronization, to a timing, at which the first HEC byte is detected.

While the output signal 108 is present, the counter control circuit 5 outputs a start signal 106 for starting outputting at a timing, at which any one of the n in number of cell header detecting circuits 41 to 4n first detects the HEC byte. Upon starting, a start value is so determined that if the cell header detecting circuit 41 first detects the HEC byte, a start value is preliminarily determined to be "1", when the cell header detecting circuit 42 first detects the HEC byte, the start value is determined to be "a" . . . , and when the cell header detecting circuit 4n first detects the HEC byte, the start value is determined to be "x". Then, the determined start value 105 is output.

By this start control, from a moment where one of the cell header detecting circuit 41 to 4n detects the HEC byte, the period of the ATM cell and the counter can be matched. On the other hand, when output signal 108 is not output from the forward and backward protection circuit 8, the start signal 106 is not output. As a result, the fifth-three base counter 6 performs free-run.

The n kinds of decoders 11 to 1n decode output signal 107 from the fifty-three base counter 6 to output results 141 to 14n (here "L" pulse). Decoded values of respective decoders 11 to 16 are assumed to be respectively "1", "a", "b", . . . "x".

In n in number of matching detecting circuits 71 to 7n, the output results 121 to 12n of six cell header detecting circuits 41 to 4n and resultant signals 131 to 13n of the decoders 11 to 1n are compared. When matched, matching signals 141 to 14n are output, and otherwise, un-matching signals 151 to 15n are output.

The n kinds of decoders 11 to 1n decode output signal 107 from the fifty-three base counter 6 to output results 141 to 14n (here "L" pulse). Decoded values of respective decoders 11 to 1n are respectively "1". "a", "b", . . . and "x".

In n in number of matching detecting circuits 71 to 7n, the output results 121 to 12n of n in number of cell header detecting circuits 41 to 4n and resultant signals 131 to 13n of the decoders 11 to 1n are compared. When matched, matching signals 141 to 14n are output, and otherwise, un-matching signals 151 to 15n are output.

The forward and backward protection circuit 8 makes judgement whether synchronization is established or not on the basis of the matching detection resultant signals 141 to 14n or the un-matching detection resultant signals 151 to 15n for issuing output 102.

Here, the forward protection is a protection up to a timing, at which the cell becomes out of synchronization. When the HEC bytes in predetermined number are not detected continuously, judgment is made that the cell becomes out of synchronization. Here, when a predetermined number of un-matching signals are continuously received from the un-matching signal 15y (y is any one of 1 to n) of the matching detection circuits 71 to 7n, output of synchronization is judged.

Conversely from the forward protection, the backward protection outputs the result 102 as a condition where synchronization is established when the matching signals 141 to 14n are continuously received from reception of any one of the matching signals 141 to 14n in a predetermined number.

On the other hand, the output signal 108 represents a period to first detect matching from a condition out of synchronization and a period to detect next matching from once fallen out of synchronization after detection of the HEC from the condition of out of synchronization.

As set forth above, the ATM cell synchronization circuit according to the present invention, develops the ATM cells into 8×n parallel strings and permits detection of synchronization without inserting the dummy byte to enable a process at a speed of 1/n of the transmission speed. Therefore, problems in conversion of frequency for 1/n or in reduction of band due to insertion of the dummy bytes for establishing the frequency of 1/n of the transmission speed. Furthermore, since the value of n can be freely selected, the process speed of the synchronization circuit of the ATM cell can be arbitrarily selected.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An asynchronous transmission mode cell synchronization circuit for establishing synchronization of an asynchronous transmission mode cell string transmitted as eight parallel strings, comprising:

parallel developing means for performing parallel development of a data signal of said asynchronous transmission mode cell developed into eight strings into 8×n (n is an integer greater than or equal to two) data signals;

frequency dividing means for dividing an input clock signal synchronized with one clock cycle for each byte of said asynchronous transmission mode cell by n;

phase shifting means for generating n kinds of 8×n data signals with shifting phase of outputs of said parallel developing means per eight bits;

n (in number) of cell header detecting means, corresponding to n kinds of data signals, for detecting a header error control (HEC) byte in cell headers of corresponding data signals;

counting means for selectively loading n kinds of load values preliminarily set corresponding to respective of n kinds of data signals in response to detection timings of respectively corresponding cell header detecting means and for performing fifty-three base counting operation in synchronism with a divided clock of a frequency divider;

n (in number) of decoding means for detecting the output of said counting means reaching said n kind of load value;

matching detecting means for comparing n (in number) of decoded output and n (in number) of outputs of the corresponding cell header detecting means; and synchronization establishment detecting means for detecting establishment of synchronization in response to a matching detection signal from said matching detecting means.

2. An asynchronous transmission mode cell synchronization circuit as set forth in claim 1, wherein said synchronization establishment detecting means is constructed to detect establishment of synchronization only when a predetermined number of said matching signals of said matching detecting means are continuously generated.

3. An asynchronous transmission mode cell synchronization circuit as set forth in claim 1, wherein said synchronization establishment detecting means detects an out of synchronization condition only when a predetermined number of un-matching signals are continuously generated by said matching detecting means.

4. An asynchronous transmission mode cell synchronization circuit as set forth in claim 1, wherein said synchronization establishment detecting means includes means for generating a signal for masking said load signal until the first matching signal is generated from the condition of out of synchronization.

5. An asynchronous transmission mode cell synchronization circuit for establishing synchronization of an asynchronous transmission mode cell string having cells, each having fifty-three bytes and transmitted as eight parallel strings, by detecting a fifth order byte in a cell header of the asynchronous transmission mode cell string, comprising:

parallel developing means for performing parallel development of a data signal of said asynchronous transmission mode cell developed into eight strings into 8×n (n is an integer greater than or equal to two) data signals;

frequency dividing means for dividing an input clock signal synchronized with one clock cycle for each byte of said asynchronous transmission mode cell by n;

phase shifting means for generating n kinds of 8×n data signals with shifting phase of the outputs of said parallel developing means per eight bits;

n (in number) of cell header detecting means, corresponding to n kinds of data signals, for detecting said fifth order byte in cell headers of corresponding data signals;

counting means for counting one to fifty-three, corresponding to said fifty-three bytes in said asynchronous transmission mode cell, and selectively loading n kinds of load values preliminarily set corresponding to respective of n kinds of data signals in response to detection timings of respectively corresponding cell header detecting means and for performing said counting in synchronism with a divided clock of a frequency divider;

n (in number) of decoding means for detecting the output of said counting means reaching said n kind of load value;

matching detecting means for comparing n (in number) of decoded output and n (in number) of outputs of the corresponding cell header detecting means; and synchronization establishment detecting means for detecting establishment of synchronization in response to a matching detection signal from said matching detecting means.

6. An asynchronous transmission mode cell synchronization circuit as set forth in claim 5, wherein said fifth order byte is a Header Error Control byte.

7. An asynchronous transmission mode cell synchronization circuit as set forth in claim 5, wherein said synchronization establishment detecting means is constructed to detect establishment of synchronization only when a predetermined number of said matching signals of said matching detecting means are continuously generated.

8. An asynchronous transmission mode cell synchronization circuit as set forth in claim 5, wherein said synchronization establishment detecting detects an out of synchronization condition only when a predetermined number of un-matching signals are continuously generated by said matching detecting means.

9. An asynchronous transmission mode cell synchronization circuit as set forth in claim 5, wherein said synchronization establishment detecting means includes means for generating a signal for masking said load signal until the first matching signal is generated from the condition of out of synchronization.

* * * * *